(12) United States Patent
Chang et al.

(10) Patent No.: US 8,721,154 B2
(45) Date of Patent: May 13, 2014

(54) BACKLIGHT MODULE AND MANUFACTURING METHOD THEREOF, AND LIQUID CRYSTAL DISPLAY DEVICE

(75) Inventors: Kuang-Yao Chang, Shenzhen (CN); Hu He, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 48 days.

(21) Appl. No.: 13/375,541

(22) PCT Filed: Nov. 8, 2011

(86) PCT No.: PCT/CN2011/081950
§ 371 (c)(1),
(2), (4) Date: Dec. 1, 2011

(87) PCT Pub. No.: WO2013/063819
PCT Pub. Date: May 10, 2013

(65) Prior Publication Data
US 2013/0107577 A1 May 2, 2013

(30) Foreign Application Priority Data
Nov. 1, 2011 (CN) .......................... 2011 1 0339386

(51) Int. Cl.
*F21V 7/04* (2006.01)
(52) U.S. Cl.
USPC .......................................... 362/627; 362/621
(58) Field of Classification Search
USPC .......................................... 362/627, 621–622
See application file for complete search history.

(56) References Cited

U.S. PATENT DOCUMENTS

| 7,808,581 B2 | 10/2010 | Panagotacos |
| 2007/0070648 A1* | 3/2007 | Kim ............................. 362/600 |
| 2009/0185107 A1 | 7/2009 | Panagotacos et al. |
| 2009/0268126 A1 | 10/2009 | Son et al. |
| 2011/0305041 A1* | 12/2011 | Louh ............................ 362/614 |

FOREIGN PATENT DOCUMENTS

| CN | 1940674 A | 4/2007 |
| CN | 101526641 A | 9/2009 |
| WO | WO2010090996 A1 | 8/2010 |

\* cited by examiner

*Primary Examiner* — Anne Hines
(74) *Attorney, Agent, or Firm* — IPro, Inc.; Na Xu

(57) ABSTRACT

The invention discloses a backlight module, a manufacturing method thereof, and an LCD device. A backlight module comprises an LGP; the light emergent surface of the LGP is covered with more than two material layers with different refractive indexes. In the invention, coatings of different refractive indexes are covered on the light emergent surface of the LGP, P light selectively transmitted, S light is reflected to the LGP for being reflected and converted to P light and then is transmitted again. The transmittance of the P light is increased by such repetition. The utilization rate of light energy is increased, and the brightness of LCDs is increased. In addition, that the material layers with different refractive indexes are covered on the light emergent surface of the LGP can be carried out using various processing modes, such as making general adhesive membranes in advance, or directly coating coatings onto the light emergent surface of the LGP, etc. The mode has the advantage of simple process, and is suitable for manufacturers to select the technical scheme of lower cost in accordance with self situation to reduce production cost.

3 Claims, 3 Drawing Sheets

BACKLIGHT MODULE AND MANUFACTURING METHOD THEREOF, AND LIQUID CRYSTAL DISPLAY DEVICE

TECHNICAL FIELD

The invention relates to the field of displays, and more particularly to a backlight module, a manufacturing method thereof, and a liquid crystal display (LCD) device.

BACKGROUND

As shown in FIG. 1, an existing LCD device includes a panel and a backlight module; the surface part and the bottom part of the panel are respectively provided with a color filter (CF) substrate and a thin film transistor (TFT) substrate, and the two glass substrates are respectively attached with a polaroid. Each polaroid has the function of selecting light so that light with the same polarization direction as that of the polaroid can pass through the polaroid. When the light of the backlight module is radiated to the lower polaroid, light with the same polarization direction as that of the lower polaroid passes through the lower polaroid; because liquid crystal in the panel has birefringent characteristics, the polarization direction of light is caused to deflect by different deflecting directions of the liquid crystal, and light is selected again when passing through the upper polaroid. The intensity of light emitted from the panel is controlled by the deflecting direction of the liquid crystal, and the polaroid is equivalent to a switch for filtering the polarization direction. Because only P light whose direction is the same as that of the polaroid can pass through the polaroid, accordingly, partial light can not pass through the polaroid, causing the brightness of an LCD device to be reduced, and the light energy to be wasted.

The U.S. Patent US20090185107 discloses a structure of a backlight module. In the invention, the light emergent surface of the backlight module is additionally provided with a lens structure. The lens structure can select P light to pass through a polaroid and reflect the rest light back to the backlight module. The light changes deflecting directions by being refracted and reflected by optical devices in the module and then passes through the lens structure. The light utilization rate can be increased by such repetition. However, the lens structure is complicated and has high manufacturing cost.

SUMMARY

The aim of the invention is to provide a backlight module, a manufacturing method thereof, and an LCD device thereof capable of being simply manufactured and increasing light utilization rate at low cost.

The purpose of the invention is achieved by the following technical schemes.

A backlight module comprises a light guide plate (LGP), and the light emergent surface of the LGP is covered with more than two material layers with different refractive indexes.

Preferably, the material layers with different refractive indexes are coatings directly coated on the light emergent surface of the LGP. The coating mode has the advantages of simple process, cheap material, and reduction of production cost.

Preferably, all the material layers with different refractive indexes have consistent thickness. Consistent thickness can simplify the process technology.

Preferably, the coatings are made of UV curing agent, the refractive index of the UV curing agent of each coating at least comprises more than two different refractive indexes. The coatings are made of UV curing agent material with low cost, so that the cost is further reduced.

A manufacturing method of backlight module comprises step A: covering more than two material layers with different refractive indexes on a light emergent surface of an LGP.

Preferably, in the step A, after the LGP is formed, the light emergent surface of the LGP is coated or rolled with multiple material layers with different refractive indexes. The coating or rolling mode has the advantages of simple process, cheap material, and reduction of production cost.

Preferably, in the step A, the multiple material layers with different refractive indexes can be cured by one or multiple curing modes comprising UV curing, infrared curing, and natural cooling. The most economical cooling mode can be selected in accordance with the specific implementation condition, so that the cost can be further reduced. The co-pressing and forming mode can simplify the production process for further reducing cost and obtaining thinner coatings. Thus, the coating with a multilayer structure can be formed in the limited space, the light selecting effect can be enhanced, the material layers can be tightly bonded, and high flatness and consistency can be obtained.

Preferably, in the step A, after the LGP is formed, the material layers with different refractive indexes are bonded to the light emergent surface of the LGP. Thus, the backlight module is made on one side, and an adhesive membrane is made on the other side by using the mode of parallel operation. Therefore, the production efficiency is increased.

Preferably, in the step A, the multiple material layers with different refractive indexes and the LGP are co-pressed and formed once, and then are cured by natural cooling. The coatings can be formed in the process of manufacturing the LGP by the co-pressing and forming mode, the production process can be simplified, and the cost can be further reduced. Meanwhile, thinner coatings can be obtained, coatings of multilayer structure can be formed in a limited space, and light selecting effect can be enhanced.

Preferably, in the step A, the multiple material layers with different refractive indexes can be cured by natural cooling. This is a curing mode of co-pressed and formed material layers.

An LCD device comprises the aforementioned backlight module.

In the invention, coatings of different refractive indexes are covered on the light emergent surface of the LGP, P light is selectively transmitted, and S light is reflected to the LGP for being reflected and converted to P light and then is transmitted again. The transmittance of P light is increased by such repetition. Thus, the utilization rate of light energy is increased, and so does the brightness of LCDs. The fabrication process of the LCD device becomes simpler, and the processing cost is obviously reduced while the utilization rate of light energy is increased and the brightness of LCDs enhanced.

In addition, to make the material layers with different refractive indexes covered on the light emergent surface of the LGP, various processing modes, such as making general adhesive membranes in advance, or directly coating coatings onto the light emergent surface of the LGP, etc., are provided. The mode has the advantage of simple process, and is suitable for manufacturers to select the technical scheme of lower cost in accordance with self situation to reduce production cost.

Wherein: 1 CF substrate; 2. TFT substrate; 31. upper polaroid; 32. lower polaroid; 4. optical diaphragm; 5. LGP; 6. reflection sheet; 7. light-emitting diode (LED).

DETAILED DESCRIPTION

The invention will further be described in detail in accordance with the figures and the preferred examples.

Figure 1:
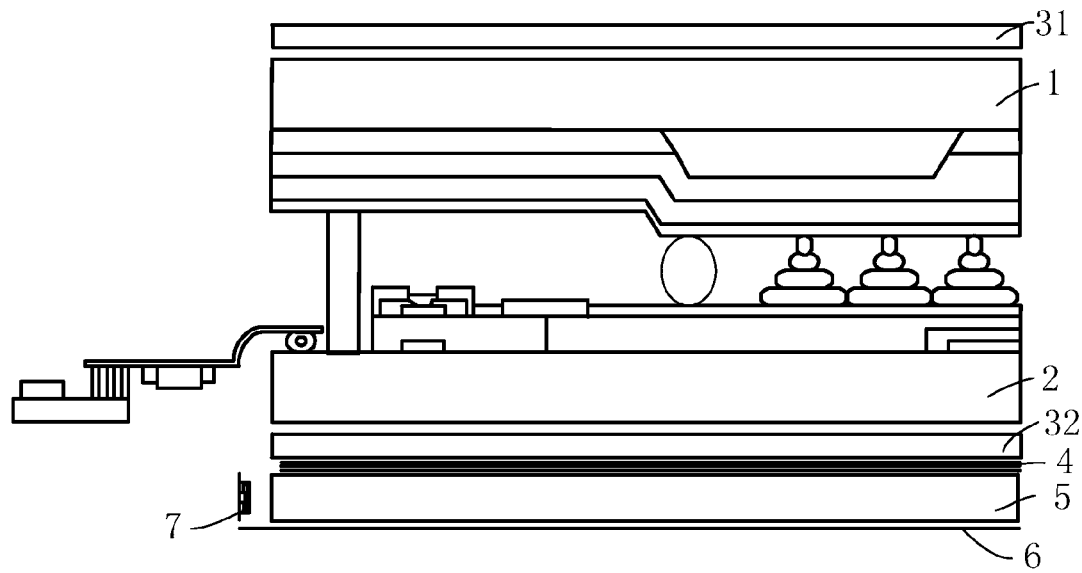
FIG. 1 is a structure diagram of an LCD device.

As show FIG. 1, an LCD device comprises a panel and a backlight module; the surface part and the bottom part of the panel are respectively disposed with a CF substrate 1 and a TFT substrate 2. The light emergent surface of the CF substrate 1 is provided with an upper polaroid 31, and the light incident surface of the TFT substrate 2 is provided with a lower polaroid 32. In the edge type backlight module, light emitted by an LED 7 is reflected by the LGP 5 and a reflection sheet 6 at the bottom of the LGP for many times is refracted out from the light emergent surface of the LGP, and enters the lower polaroid 32 after being diffused and equalized by an optical diaphragm 4.

In the LCD device, each polaroid has the function for selecting light so that light with the same polarization direction as that of the polaroid passes through the polaroid. When the light of the backlight module is radiated to the lower polaroid, light with the same polarization direction as that of the lower polaroid passes through the lower polaroid. Because liquid crystal in the panel has birefringent characteristics, the polarization direction of light is caused to deflect by different deflecting directions of the liquid crystal, and light is selected again when passing through the upper polaroid 31. The intensity of light emitted from the panel is controlled by the deflecting direction of the liquid crystal, and the polaroid is equivalent to a switch for filtering the polarization direction.

Under such operating principle, for the light to enter the panel, the more the light with the polarization direction as that of the lower polaroid is, the more the light passes through the lower polaroid 32. Thus, the utilization rate of light is increased. Quite simply, the efficiency can be improved by changing the polarization state of the backlight source.

Figure 2:
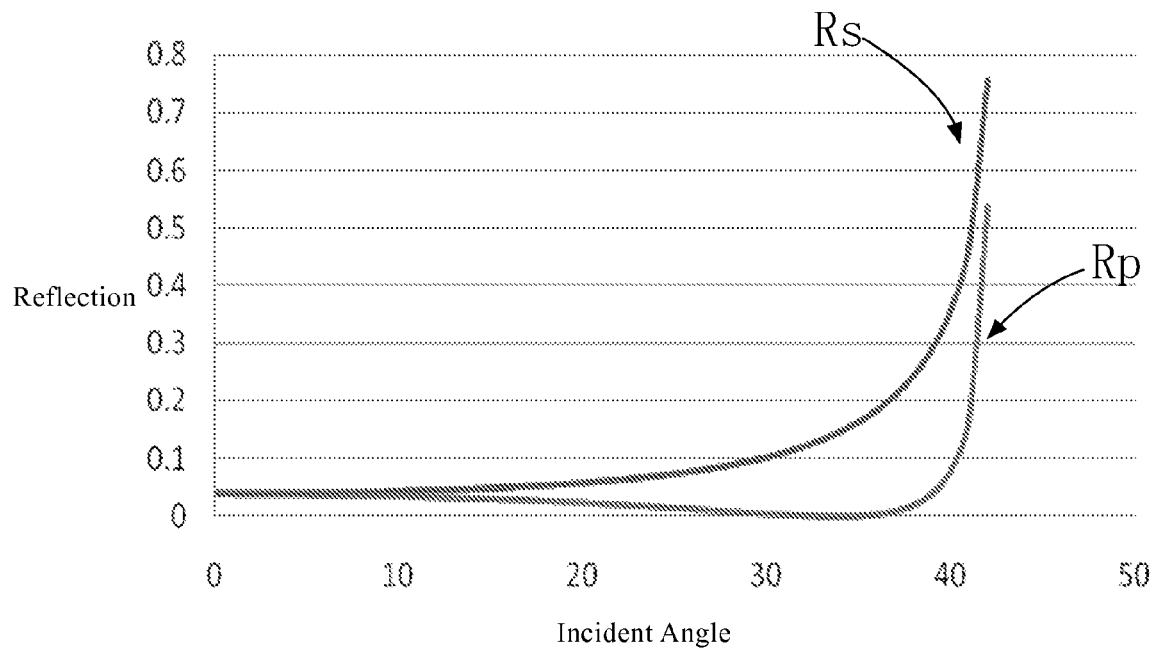
FIG. 2 is a schematic diagram of the reflecting effects of P light and S light at different incident angles.

As shown in FIG. 2, for the edge type backlight module, when light is transmitted in the LGP, because the reflective indexes of P light and S light at different incident angles are different, different degree of polarization states can be caused.

Figure 3:
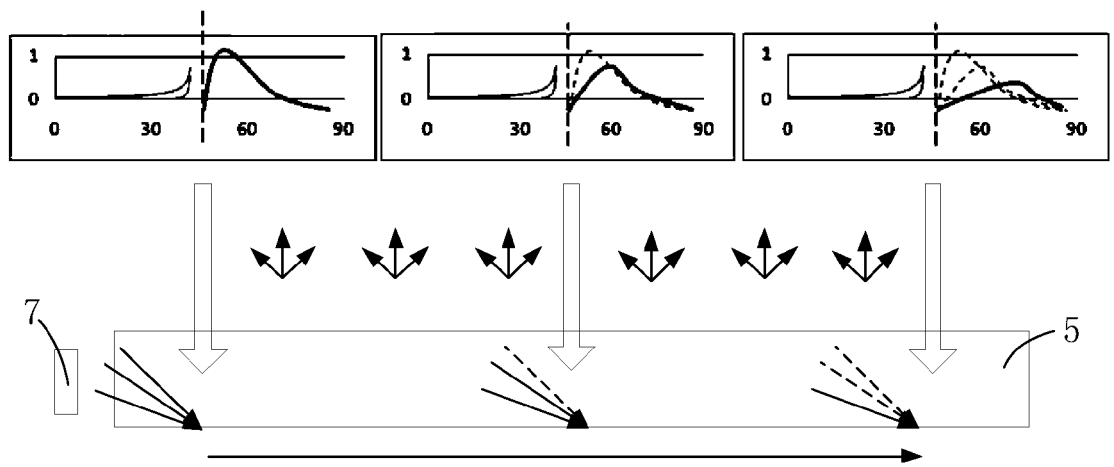
FIG. 3 is a schematic diagram of a change of a polarization state of light in the edge type backlight module with transmission.

As shown in FIG. 3, for the edge type backlight module, because the transmission distances of light are different, and the angle distribution of the light is different from that of the reflected light in the LGP 5, the polarization states of light emitted from the LGP 5 in different positions are different. As shown in the figure, the longer the transmission distance to the LED7 light source is, the slighter the polarization phenomenon is. If the direction of the emitted light is the same as that of the lower polaroid of the panel, the efficiency of the emitted light is improved.

Figure 4:
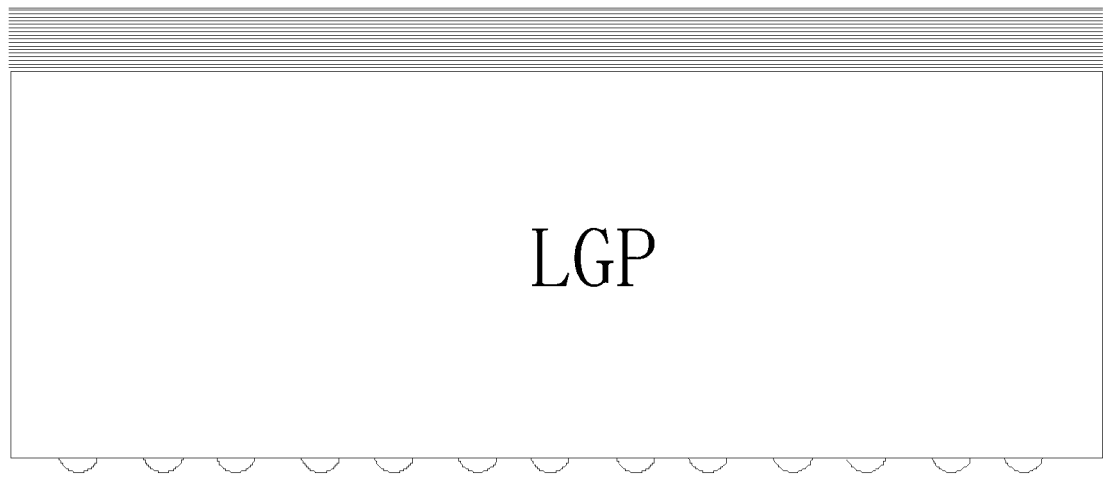
FIG. 4 is a schematic diagram of coatings of the invention.

As shown in FIG. 4, in accordance with the aforementioned research, in the LCD device and the backlight module of the invention, more than two material layers with different refractive indexes are covered on the light emergent surface of the LGP 5. The invention will further be described in detail in accordance the specific examples.

EXAMPLE 1

The material layers having different refractive indexes are adhesive membranes having different refractive indexes which are previously made, and then the adhesive membranes having different refractive indexes are covered on the light emergent surface of the LGP by a multilayer adhesive membrane mode. The adhesive membranes have the same thickness to simplify the processing technology.

EXAMPLE 2

The material layers with different refractive indexes are coatings directly coated or rolled on the light emergent surface of the LGP. Each coating is made of low cost of material such as UV curing agent. The material is coated on the light emergent surface of the LGP by printing press, rolling, etc. and is cured by light sources such as ultraviolet light, infrared light and the like in accordance with material types. Material capable of being cured at normal temperature can be cured by natural cooling. Furthermore, all the coatings having different refractive indexes have consistent thickness. Consistent thickness can simplify the process technology.

EXAMPLE 3

Figure 5:
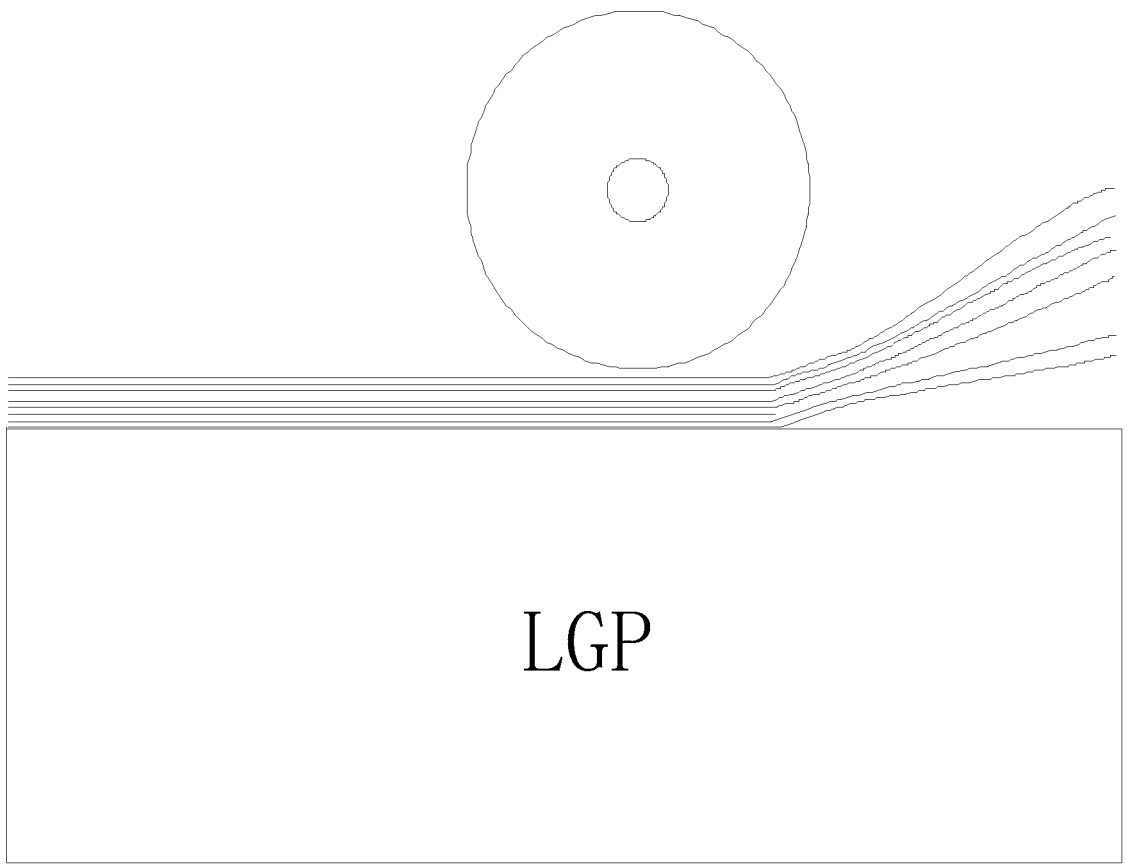
FIG. 5 is a schematic diagram of a method for making coatings with a multilayer structure on an LGP by using the roll forming mode.

As shown in FIG. 5, in the invention, the material layers with different refractive indexes and the LGP can be co-pressed and formed by the co-pressing and forming mode in the LGP manufacturing process, and then are cured by natural cooling. Because the coatings is formed in the LGP manufacturing process by the co-pressing and forming mode, the production process can be simplified, and the cost can be reduced. Meanwhile, thinner coatings can be obtained, coatings of multilayer structure can be formed in a limited space, and light selecting effect can be enhanced.

In the traditional LGP 5 manufacturing process, each light emergent surface of the LGP 5 is Polymethyl Methacrylate (PMMA) burnishing surface, and mura is prepared on the lower surface by printing ink printing (including UV light or infrared light manufacturing process), laser or other modes, and then light is guided. When using the traditional UV light manufacturing process, more than two UV curing agents are used on the light emergent surface of the LGP 5 for many times of UV curing treatment. The refractive indexes of different UV curing agents are different. In the end, multilayer coatings with alternative refractive indexes are formed by the UV curing agents, and the thickness of the coatings is controlled by a printing press. FIG. 4 is a side view of the LGP 5. The LGP 5 comprises an original material plate, multiple UV curing layers, and mura. The multiple UV curing layers have the functions for transmitting P light and reflecting S light. Only light whose angle is more than the inner total reflection angle can enter the multiple UV curing layers.

The LGP 5 is made of PMMA or other substitute material, which provides an inner total reflection space, and performs inner total reflection in all the areas without mura. S light reflected back by the LGP 5 is refracted and reflected for many times to form a mixed light of P+S.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. A backlight module, comprising: a light guide plate (LGP), a light emergent surface of the LGP is covered with more than two material layers, and the material layers having more than two different refractive indexes wherein each material layer has a same thickness.

2. A manufacturing method of backlight module, comprising step A: covering more than two material layers on a light emergent surface of a light guide plate (LGP), and the material layers having more than two different refractive indexes wherein each material layer has a same thickness.

3. An LCD device, comprising: a backlight module; said backlight module comprises a light guide plate (LGP); a light emergent surface of said LGP is covered with more than two material layers, and the material layers having more than two different refractive indexes wherein each material layer has a same thickness.

* * * * *